Oct. 30, 1934.　　　　　J. C. BOGLE　　　　　1,979,021
CONTROL APPARATUS FOR LIQUID FUEL BURNERS
Original Filed Feb. 21, 1930　　　5 Sheets-Sheet 2

Inventor:
John C. Bogle.
By C. A. Soper
Attorney.

Oct. 30, 1934. J. C. BOGLE 1,979,021
CONTROL APPARATUS FOR LIQUID FUEL BURNERS
Original Filed Feb. 21, 1930 5 Sheets-Sheet 4

Inventor:
John C. Bogle.
By C. P. Sofer
Attorney

Oct. 30, 1934.  J. C. BOGLE  1,979,021
CONTROL APPARATUS FOR LIQUID FUEL BURNERS
Original Filed Feb. 21, 1930   5 Sheets-Sheet 5

Inventor:
John C. Bogle
By C. P. Soper
Attorney.

Patented Oct. 30, 1934

1,979,021

UNITED STATES PATENT OFFICE 1,979,021

CONTROL APPARATUS FOR LIQUID FUEL BURNERS

John C. Bogle, Grosse Pointe, Mich.

Original application February 21, 1930, Serial No. 430,258. Divided and this application January 29, 1932, Serial No. 589,613

12 Claims. (Cl. 200—138)

This invention relates to an improvement in control apparatus for liquid fuel burners, and particularly to an automatically actuated electric control mechanism for burners of this character adapted to assist in guarding against any and all faulty operations of the burner or associated mechanism which might result in damage to the furnace, building, contents or occupants of the building. This is a division of my co-pending application filed February 21, 1930, Serial No. 430,258.

In order to insure the safe and satisfactory operation of liquid fuel burners, such as are now commonly employed for heating purposes, the control system must meet certain definite requirements upon which those skilled in the art are now generally agreed.

These requirements may be stated briefly as follows: First:—Means must be provided for governing the burner to provide fairly uniform, predetermined temperatures within the heated area. Second:—Means must be provided for preventing an undue accumulation of gas in the vicinity of the burner and subsequent ignition which might result in a destructive explosion. Third:—Means must be provided to prevent the accumulation of unburned fuel at or in the vicinity of the burner which would present a fire hazard or perhaps damage to property by contact.

The first requirement is effected by the well known thermostatic operation and will not be discussed further at this point. In order to meet the second requirement, the control means must operate to prevent, for a predetermined period, the ignition of the fuel under certain circumstances. For instance, should the fuel cease to burn after the burner and controls have assumed a condition intended to support combustion of the fuel, then the fuel should be cut off and the ignition flame effaced for a predetermined period sufficient to permit the accumulated gas to pass up the stack, when ignition may again be attempted by the automatic means. Should ignition take place while an undue quantity of gas is present, there would be danger of an explosion which might cause damage to the heating equipment or adjacent property.

Should the apparatus continue to supply oil or other fuel to the burner when ignition does not take place or fails for any reason, the liquid fuel would overflow the burner and perhaps escape from the furnace. Should ignition subsequently take place, a fire hazard would be created. The third requirement is the provision of means in the control apparatus which will prevent such faulty operation.

The generally accepted specifications which meet the requirements of the underwriters' laboratories will now be described. These requirements agree substantially with the provisions of other similar bodies and the trade generally.

Those considerations which tend to maintain, in the heated area, substantially uniform temperatures by the operation of burners employing liquid fuel will first be described.

A thermostat, located in the compartment or area to be heated, is arranged to effect the starting into operation of an intermittently fired oil burner whenever the temperature of the air in the heated area falls below a chosen predetermined temperature and to cause said operation to cease whenever another somewhat higher predetermined temperature is reached as a result of the application of heat from the liquid fuel burner to the area to be heated. The heating system may be of any desired character, such as circulating heated air, hot water or steam. After the operation of the burner has been stopped, as just above described, the burner will remain inoperative until the first mentioned predetermined lower temperature is again reached.

After the thermostat has initiated the burner operation, that is, has caused liquid fuel to be fed to the burner, the burner must be provided with means for igniting the fuel. This ignition means may be any one of several types. For example, it may continue unaltered during the non-operative period as well as during the ignition period. Such an ignition means may be a gas pilot flame of substantially constant size. The ignition means may be arranged to change to a flame of greater intensity during the period when ignition is taking place and subside again to its original proportions after ignition has been successfully accomplished. An example of this last ignition means is found in the pilot flame which is automatically changed to a flame of greater size when ignition is being effected. Another type of ignition means is rendered operative when the burner is caused to start by automatic means and continues operative during the entire period of burner operation. An example of such ignition means is found in the electric spark producing means which either ignites the oil directly or first ignites a gas flow which is controlled by automatic means. In still another type of ignition means, similar to that just above described, automatic means operate to cause the electric spark producing means and the gas flow to cease operation after the burner is in successful operation.

Those considerations which tend to eliminate the hazards of fire and explosion will now be described.

Should any part fail to function, means must be actuated to prevent the continued operation of the burner under hazardous conditions. The failure of any electrical apparatus or conductor necessary to the operation of the burner must cause the burner to assume a safe condition.

After the burner has been successfully ignited and the ignition means caused to become inoperative, should the supply of electrical energy fail and then revert before the ignition control means has sufficient time to resume its starting phase so the events of starting and ignition will occur simultaneously, the burner must be rendered incapable of restarting upon the reverting of the electrical energy supply until the ignition control means has had time to resume a condition necessary to effect the starting events in proper sequence. After the burner has been successfully ignited, should the flame discontinue, for any reason other than failure of the fuel supply, the burner would tend to continue in operation, injecting unburned fuel into a hot furnace or boiler which would produce an oil, gas and air mixture of explosive characteristics. Under this condition, the burner must be rendered inoperative for a period sufficient to permit the draft uptake to remove the unburned gases after which a restart may be attempted by automatic means.

Upon an automatic attempt at starting, should ignition fail, the burner should be rendered inoperative after it has injected oil into the furnace for a predetermined period. Under this condition the burner shall be caused automatically to cease operations by means being operated which require manual mechanical release of the parts before ignition again may be attempted.

In the control systems heretofore provided, it has been found necessary to employ such expensive and complicated apparatus in an attempt to secure the necessary control operations that the manufacturing costs have been so high as materially to limit the acceptance by people of moderate means of the benefits of the automatically controlled fuel burner for heating purposes.

The object of the present invention is the provision of dependable means for accomplishing the desired results through the medium of devices and controlling circuits of simplicity and low cost.

A feature of the invention resides in the novel circuit controlling arrangement of the stack switch.

Another feature resides in the operative arrangement of the stack switch contacts so that one set of contacts open upon initial movement of the actuating member in one direction while another set is operated upon the initial movement of the actuating member in the other direction.

Other features and advantages will appear from time to time as the description of the invention progresses.

It is believed the further disclosure of the invention will be most readily understood from a detailed description thereof taken in connection with the accompanying drawings, in which.

Figure 1:
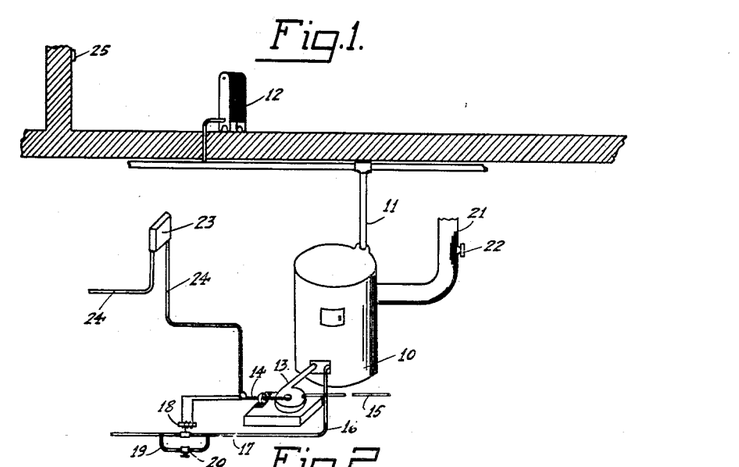
Fig. 1 is a schematic view showing the general layout of the apparatus involved in a heating system such as herein contemplated.

Referring now to the drawings, in which like reference characters indicate the same parts in the several views, (see Fig. 1) 10 indicates a furnace having therein a burner (not shown) adapted to burn fuel oil or any other fluid oil. At 11 is shown a pipe which connects the boiler of the furnace to the radiator 12 within the area to be heated. A pump or blower 13 is arranged, upon operation by motor 14, to furnish fluid fuel from the supply pipe 15 to the furnace burner. A pilot or ignition burner (not shown), associated with the heating burner, is supplied with gas or other satisfactory fuel through pipe 16. Pipe 16 is provided with a valve 17, adapted to be operated by ignition magnet 18 to permit an increased flow of gas to the ignition burner when ignition is being attempted. Pipe 16 also has a by-pass 19 about valve 17 within which may be positioned a manually operated valve 20 to control the size of the pilot flame at the ignition burner. The furnace stack 21 has therein a stack switch operating member (not shown in this view), the external switch box of which is indicated at 22. The housing or box containing the relays and other control apparatus is shown at 23, and 24 indicates the conductors through which operating current is supplied to the motor 14 and ignition magnet 18. A thermostat 25 is shown positioned within the area to be heated.

Figure 2:
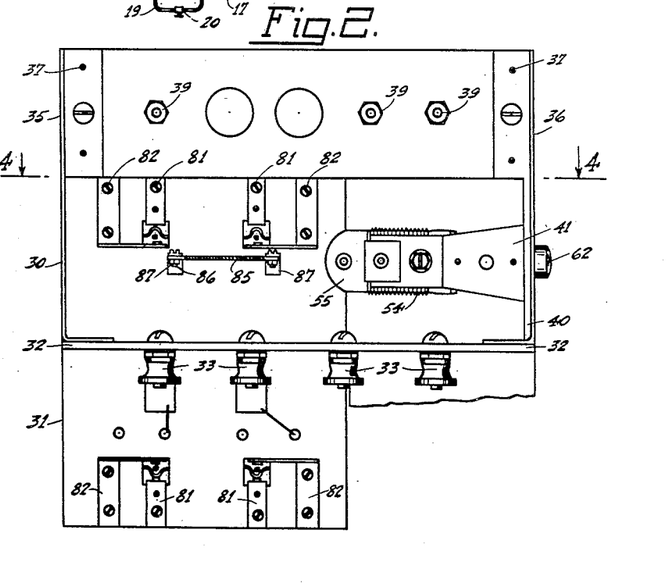
Fig. 2 shows the control apparatus within the control box, as viewed from above.

Referring now to Fig. 2, 30 and 31 represent mounting shelves of insulating material. These plates, if desired, may be formed of one continuous piece of insulation. Extending upwardly from the plates 30 and 31 is a plate or strip of insulating material 32 on which are mounted binding posts 33. Extending downwardly from plates 30 and 31 is a plate 34 of insulating material (see Figs. 4 and 5). The plates 30 and 31 are arranged at right angles to plates 32 and 34 in the form of a + sign. The manner of securing these plates in position forms no part of the present invention. By reference to Figs. 4 and 5, it may be noted that the relay frames are mounted in pairs in juxtaposed relation on opposite sides of plate 34. The relay structure will be hereinafter more fully described. Extending laterally from plate 32, one at each end thereof, are the metallic bracket members 35 and 36 to which are secured by rivets 37 a strip of insulation 38 which serves as a mounting plate for the terminal bolts 39.

Figure 4:
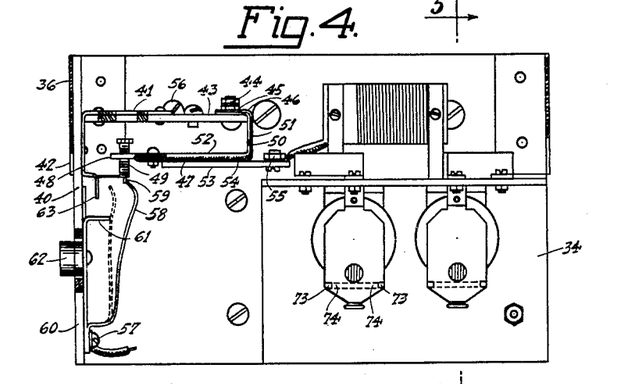
Fig. 4 is a section on the line 4—4 of Fig. 2, showing certain details of construction of the trip switch and relay arrangement.

Secured to bracket 36, in any desired manner, is a plate 40 of insulating material on which is mounted the trip timing switch, a portion of the frame of which is shown at 41 in Fig. 2. Referring now to Fig. 4, the bracket 41 is secured to plate 40 as by rivets 42. Extending to the right from bracket 41, as seen in Fig. 4, is a strip 43 of insulating material to the free end of which is secured, by means of the bolt and binding post 44, one leg 45 of a somewhat U-shaped member 46. Secured to the free end of the opposite leg 47 of member 46 is a metallic block 48 within which is screw threaded the adjustable contact 49. The free leg 47 of member 46 is composed of two flat strips 50 and 51 of metal of different coefficients of expansion, the one having the greater expansiveness being underneath in Fig. 4. Positioned on opposite sides of leg 47 are insulating sheets 52 and 53 of mica or other suitable material. Wound about the mica sheets 52 and 53 is a heating coil 54, one end of which is joined to binding post 55 on mica plate 53, the other being joined to binding post 56 on insulation strip 43.

Secured to plate 40 by binding screw 57 is one end of contact spring 58, the upper end of which is arranged normally to engage the reduced lower end 59 of contact screw 49. Binding screw 57 also secures to plate 40 one end of a resilient metal strip 60 provided with a lateral projection 61. Secured to strip 60 and extending through a hole in plate 40 is a button 62, by means of which strip 62 may be displaced to cause its projection 61 to restore contact spring 58 into operative relation to contact 59 after said spring has been released to the position shown in dotted lines in Fig. 4 by the warping action of strips 50 and 51 when heated. An offset end 63 on bracket 41 acts to limit the inward movement of strip 60.

The operation of the trip switch which has just been described briefly is as follows: When electric current is passed through the heat coil 54 for a predetermined period, say two or three minutes, the greater expansiveness of the lower strip 51 causes contact screw to be moved upwardly until it disengages contact spring 58 which then assumes its dotted line position. As will later appear, the burner is now rendered inoperative until the warp element has cooled and spring 58 has been restored to engagement behind contact 59 by the manual actuation of button 62.

The structure of the relays will next be described. Four relays are employed in the present control circuits which, as above indicated, are mounted in pairs, two on each side of plate 34 and below plates 30 and 31. As the relays are all substantially identical in structure, only one of them will be described in detail. The relay frame consists of a substantially U-shaped piece of metal 70, the base of which is secured adjacent to insulating plate 34 in any desired manner. The inner end of the relay core 71 is secured to the base of member 70 in any desired manner, as by being riveted thereto. At 72 is shown the relay coil or winding, of conventional form, which is positioned about core 71 in the usual manner.

Figure 5:
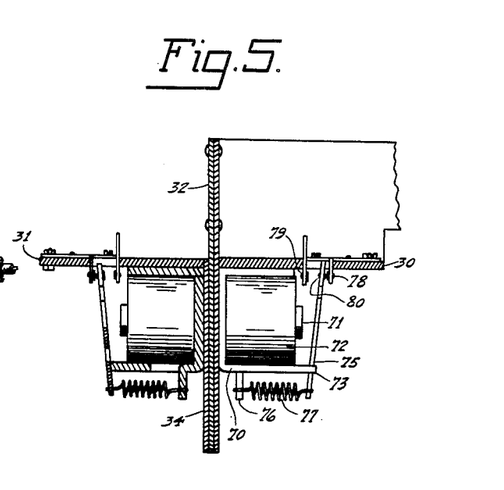
Fig. 5 is a view substantially on the line 5—5 of Fig. 4, showing further details of the relay arrangement.

Extending outwardly from the end of the lower leg of member 70, one at each edge thereof, are the lugs 73 (Figs. 4 and 5) which are received by notches 74 in the lateral edges of the armature 75. Punched up from the lower leg of member 70 is a lug 76 to which is attached one end of the retractile coil spring 77, the other end of said spring being attached to the lower end of armature 75 and normally acting to maintain the armature retracted, as shown in Fig. 5. Extending downwardly through an opening in insulating plate 30 (or 31, as the case may be) is the back contact 78 and front contact 79 arranged to be engaged by contacts 80 at the upper end of the relay armature. The contacts 78 and 79 are carried by strips 81 and 82, respectively, secured to the upper face of plate 30 or 31 as shown in Fig. 2.

In Fig. 2 is shown a limiting resistance which consists of a coil 85 of resistance wire about a strip 86 of insulation, as mica, supported on the posts or brackets 87.

Figure 3:
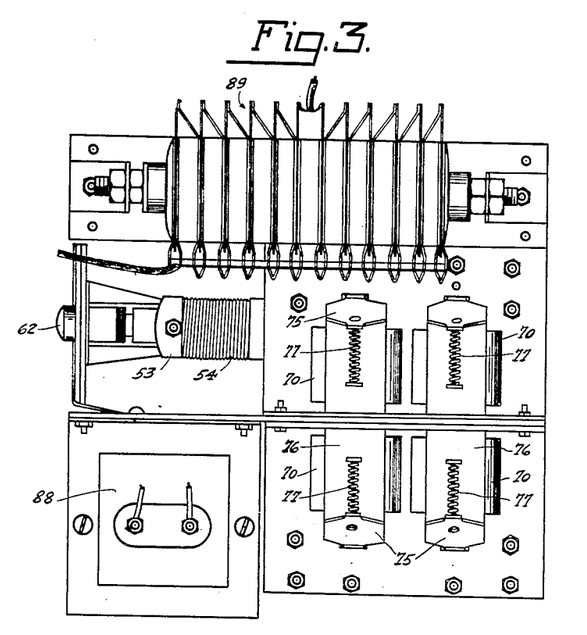
Fig. 3 is a view of the same apparatus as seen from the bottom of the box.

In Fig. 3 appears the housing 88 of the transformer, hereinafter referred to, and the plate rectifier indicated generally by reference character 89.

As there is nothing novel about the transformer employed, it will not be further described except as to its use in the control circuits.

The rectifier is of the variety commonly referred to as plate rectifiers comprising a series of copper plates. As this form of rectifier is well known in the art, it will not be described in detail.

Figure 6:
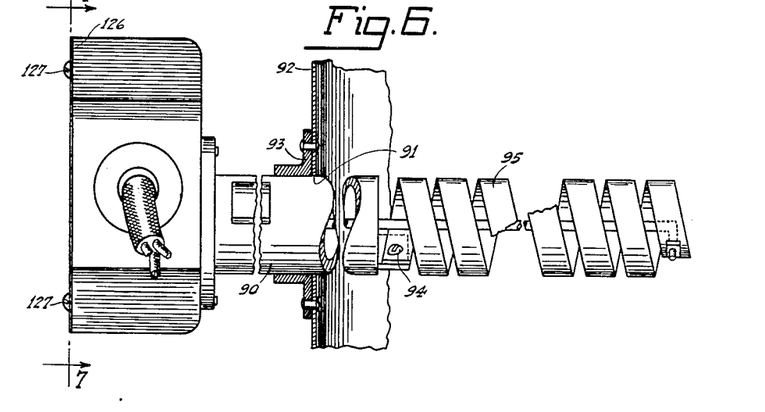
Fig. 6 is a side view of the stack switch positioned in the stack, parts being cut away more clearly to show the construction.

The construction of the stack switch will now be described. Referring to Fig. 6, 90 represents the mounting collar of the switch which is secured in an opening 91 in stack 92 through the medium of collar 93. Secured to the inner end of collar 90, as by a screw 94, is one end of a spiral, bimetal operating member 95. The member 95 is formed of two flat strips of metal of different coefficients of expansion with the strip of greater expansiveness on the inner side so that, upon an increase of temperature, the spiral will tend to uncoil.

Figure 8:
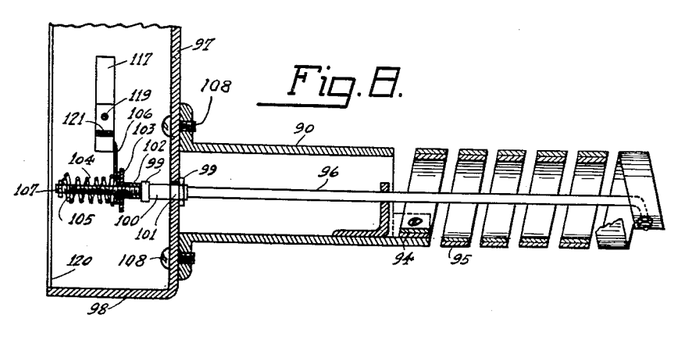
Fig. 8 is a section through the stack switch substantially on the line 8—8 of Fig. 7.

Secured to the free end of spiral 95 is the end of a spindle 96, the other end of which extends through collar 90 and the adjacent plate 97 of the switch housing 98, as shown in Fig. 8. Positioned on the outer screw-threaded end of spindle 96 are nuts 99 between which is secured the sleeve 100 received by the opening 101 in the plate 97. Also positioned about the outer end of spindle 96 is a collar 102 and thrust washer 103. Held in engagement with washer 103, by means of the coil spring 104, between cup washers 105 is the actuating arm 106 of the switch member which may be of insulating material. A nut 107 is provided at the free end of spindle 96 to maintain spring 104 under compression. It readily will be understod that the parts just above described provide a friction clutch between spindle 96 and actuating arm 106, whereby arm 106 is normally rotated with the spindle 96 but permits continued movement of the spindle when rotation of said arm 106 is restricted as by a limiting stop.

All the switch elements are within the box or housing 98 secured to the outer end of collar 90 as by screws 108. Supported from the bottom 97 of box 98, as by a bracket 109, is a strip 110 of insulating material, to the opposite sides of which are secured the flexible contact springs 111 and 112. A binding post terminal 113 is also secured to strip 110, the springs 111, 112 and terminal 113 being electrically united and all fixed to strip 110 by means of the bolt or rivet 114. Stationary contacts 115 and 116 are also fixed to insulation strip 110 in positions to be engaged, respectively, by springs 111 and 112.

Figure 7:
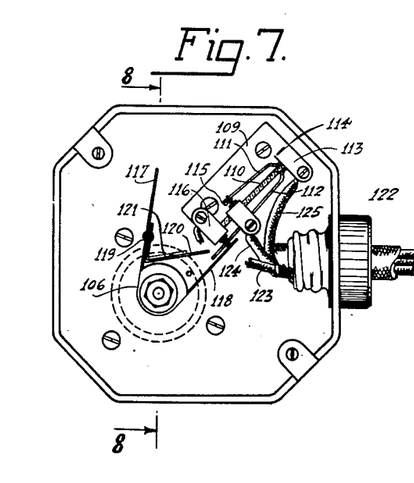
Fig. 7 is a view of the switching mechanism within the switch box at the left in Fig. 6, the box cover being removed.

Fixed to the actuating arm 106 of insulating material in any desired manner are the switch operating fingers 117 and 118. When spindle 96 and consequently finger 117 is moved in a clockwise direction, as viewed in Fig. 7, due to cooling of the bimetal spiral 95, finger 117 engages spring 111 and, upon continued rotation of the switch member, forces said spring into engagement with its contact 115. Upon heating of spiral 95, the switch fingers are rotated in a counterclockwise direction, as seen in Fig. 7.

It may be here explained that spring 111 is so adjusted that it is normally separated from its contact 115, and spring 112 is so adjusted that it tends to remain in engagement with its contact 116 at all times except when separated therefrom by means presently to be described.

Fixed to operating finger 117, as by a rivet 119, is a flexible finger 120. Flexible finger 120 is backed or supported for a portion of its length by a more rigid member 121, also secured to finger 117 by rivet 119. Now, as the switching head is rotated in a counterclockwise direction due to the products of combustion heating the bimetal spiral 95, flexible finger 120 will first engage and then slide over the end of contact spring 112 without separating it from its fixed contact 116. Shortly thereafter finger 118 will engage spring 112 or other suitable stop and further clockwise rotation of the switching head will be prevented. The parts will now be in the positions indicated in Fig. 7.

Due to the previously described friction clutch connection between the switching head and the spindle 96, the said spindle is permitted to continue to rotate so long as the temperature of spiral 95 continues to increase. The switch parts will now remain in the condition illustrated in Fig. 7 until spindle 96 is rotated to cause the switching head to move in a clockwise direction, as seen in Fig. 7. This may be caused by failure of ignition at the furnace burner due either to failure of fuel or failure of electrical energy.

As soon as the switching head starts to move in a clockwise direction, flexible finger 120 engages the end of spring 112, and, as said finger is now reinforced by the more rigid member 121, spring 112 is separated from its contact 116. Upon continued clockwise rotation of the switching head, spring finger 120 slips over the end of spring 112 which immediately returns into engagement with its contact 116.

As cooling of spiral 95 continues, finger 117 is brought into engagement with spring 111 and forces said spring again into engagement with its contact 115. Here again the rotary movement of the switching head is limited, but due to the friction clutch connection the spindle 96 may continue to rotate until the spiral 95 is entirely cool.

This insures the prompt opening of contacts 111, 115 when the spiral 95 next starts to become heated. The slippage in the opposite direction insures prompt opening of contacts 112, 116 when the spiral starts to cool.

At 122 is shown a sleeve of insulating material through which conductors 123, 124 and 125 pass and are connected, respectively, to contacts 115, 116 and terminal 113. The switch housing 98 is provided with a cover 126 secured thereto by means of screws 127.

Figure 9:
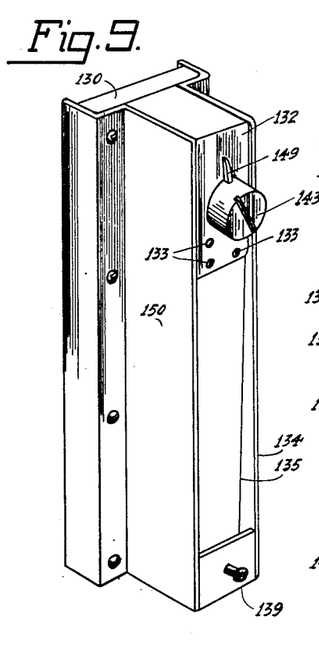
Fig. 9 is a perspective view of the thermostat.
Figure 10:
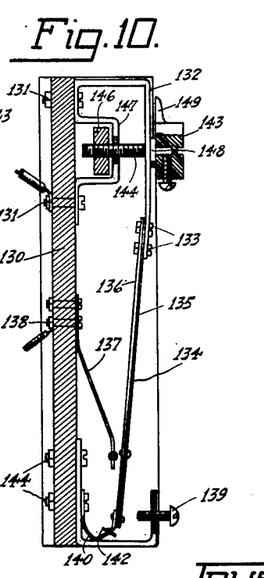
Fig. 10 is a longitudinal sectional view through the thermostat.

In Figs. 9 and 10 is shown the thermostat employed. To the supporting base 130 of insulating material is secured, by means of screws or bolts 131, the multi-ply spring 132. To the free end of spring 132 is secured, by means of bolts or rivets 133, one end of the bimetal heat responsive arm 134. Arm 134 is composed of two flat strips 135 and 136 of metal fixed with their flat surfaces in engagement. The left strip, in Fig. 10, has the higher coefficient of expansion and when the temperature of arm 134 is decreased, its lower free end moves to the left bringing said arm into engagement with contact spring 137 secured to base 130 by means of bolts 138. When the temperature of arm 134 is increased, its lower end moves to the right, separating said arm from contact spring. A screw stop 139 is provided to limit the movement of arm 134 to the right. At 140 is shown a light leaf spring, one end of which is secured to base 130 by bolts 141. The free end of spring 140 lightly engages the friction member 142 attached to the end of thermal element 134. Thus a certain amount of stress must be produced in the bimetal element 134 before said element will move either into or out of engagement with contact spring 137, thus insuring quick action from "closed" position to "open", and vice versa. This arrangement prevents the vibration of element 134 and the rapidly repeated engagement and disengagement of the thermostat contacts.

The thermostat may be manually adjusted to close its contacts at any predetermined desired temperature. This is accomplished by rotation of knob 143 to which is fixed one end of the threaded member 144 by means of calibrating set screw 145. A nut 146, threaded on the opposite end of threaded member 144, is prevented from turning by its position within the fork 147 of multi-ply spring 132. A shoulder or flange 148 on threaded member 144 is adapted to engage multi-ply spring 132 to cause its lower end to move in one direction or the other, as the case may be, in order that the thermostat contacts may close at the selected predetermined temperature. A scale may be provided in connection with pointer 149 so as to make readily visible the setting of the thermostat. The thermostat elements may be enclosed in a housing or box 150 as illustrated in Fig. 9.

Having described the structure of the apparatus employed, its use in the circuits of the control system will now be explained.

Figure 11:
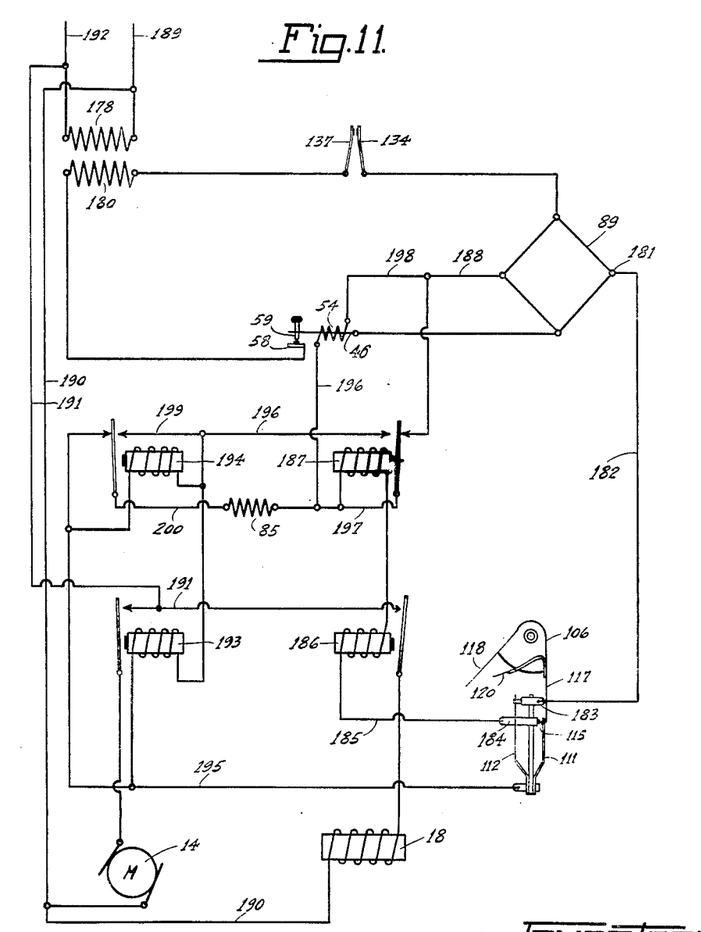
Fig. 11 diagrammatically illustrates the circuits and apparatus employed in the invention.

We will now refer to the circuits of Fig. 11 in which is employed the apparatus shown in Figs. 2 to 10 of the drawings.

We will assume that all parts of the apparatus are at normal and the thermostat operates to close its contacts 58 and 59. Current from the secondary coil 180 of the transformer 178 will now pass to the rectifier 89 and current will flow from the terminal 181 of the rectifier over conductor 182 to terminal block 183, thence through contact 116, spring 112, spring 111, contact 115, terminal block 184, conductor 185, the winding of ignition relay 186, winding of initiating relay 187, winding 54 of the warp switch, to the terminal 188 of the rectifier. Relays 186 and 187 are both energized. Relay 186 closes a circuit for the ignition valve operating magnet 18 as follows: From conductor 189 of the power circuit, over conductor 190, through the winding of magnet 18, contacts of relay 186 and back over conductor 191 to the other side 192 of the power circuit. Magnet 18 is energized and opens valve 17 (Fig. 1), causing an ignition flame to be supplied at the burner.

Relay 187 closes a circuit for relays 193 and 194 as follows: from rectifier terminal 181 over conductor 182, terminal block 183, contact 116, spring 112, conductor 195, relays 193 and 194 in parallel, conductor 196, front contacts of relay 187, conductor 197, winding 54 of warp switch 46 and conductor 198 back to rectifier terminal 188. Relays 193 and 194 are energized in parallel with each other and in parallel with relays 186 and 187. Relay 193 closes a circuit for fuel supply motor 14 as follows: from conductor 189, over conductor 190, windings of motor 14, contacts of relay 193 and conductor 191 back to the other side 192 of the power circuit. Fuel is now supplied to the burner and, as the ignition valve has been operated by magnet 18, ignition should take place at the burner.

Relay 194, at its front contact, closes a locking circuit for its winding and also for the winding of motor relay 193 which will function in a manner presently to be described.

If ignition occurs as above described, the heated products of combustion in a short time affect the stack switch, causing the arms 117 and 118 to be rotated in a counterclockwise direction as viewed in Fig. 11. The initial movement of arm 117 permits spring 111 to separate from contact 115, thus interrupting the previously traced circuit for relays 186 and 187. Relay 186 interrupts the circuit of ignition magnet 18, causing the ignition flame to be extinguished, leaving merely a small pilot flame. Relay 187, at its back contact, closes a substitute circuit for relays 193 and 194 as follows: from conductor 182 through contact 116, spring 112, conductor 195, windings of relays 193 and 194 in parallel, conductor 199, front contact and armature of relay 194, conductor 200, resistance 85, armature and back contact of relay 187 back to the opposite terminal of rectifier 89.

It will be noted that this last traced circuit does not include the winding of warp switch 46 which now cools without having actuated its contacts.

Relays 193 and 194 remain energized over the circuit including the locking contact of relay 194, and fuel is fed continuously to the burner by motor 14 until one of two things occurs. When, however, either thermostat contacts 134, 137 or stack switch contacts 112, 116 open, these relays are deprived of current and all apparatus returns to normal. They also would be deprived of current whenever the operating current in the system fails for any reason.

When the thermostat operates to open contacts 134, 137, upon the temperature reaching a predetermined point, the flow of induced current from transformer 88 to the rectifier 89 is interrupted and consequently relays 193 and 194 are deprived of energizing current. It will be noted that the back contact of relay 194 is joined to its winding. This is to put a load on the system whenever the stack switch is in running position and the burner at rest. Under this condition, the rectifier would otherwise be energized and open circuited on the output side.

Should the flame of the burner fail, for any reason, as for instance failure of fuel either temporarily or permanently, the stack switch actuating member 95 will immediately start to cool and rotate arms 117 and 118 in a clockwise direction, as viewed in Fig. 11. After a short period of time, the flexible finger 120 will engage the end of contact spring 112, and upon continued operation of the stack switch will separate it from contact 116. This will open the locking circuit for relays 193 and 194 and all apparatus will return to normal condition as before.

Upon continued clockwise rotation of the stack switch, the finger 120 slips off the end of contact spring 112 which again engages contact 116. After a period of time sufficient to permit any undue accumulation of gas to be drawn up the stack, stack switch arm 117 engages contact spring 111 and forces it into engagement with contact 115. The apparatus is now returned to normal condition, ready again to initiate operation of the ignition magnet 18 and motor 14 if or when the thermostat contacts 134, 137 are closed.

The delay in closing stack switch contacts 111, 115 greatly reduces the danger of explosion which often occurs due to an accumulation of gas in the furnace with subsequent ignition.

We will assume that following an operation as just described the thermostat contacts 134, 137 are closed or have been closed continuously. As all parts of the control apparatus are now at normal, the same operation of relays 186, 187, 193 and 194 and ignition magnet 18 and motor 14 will take place as above described.

If ignition takes place, the stack switch will function and the winding of warp switch 46 will be short-circuited by a circuit including the back contact of relay 187, as previously explained, and the warp switch will not operate. If, however, ignition does not take place, current continues to flow through the winding 54 of the warp switch and after a predetermined time the warp switch contacts 58, 59 are tripped. This interrupts the flow of current to the rectifier 89 and all the apparatus, with the exception of the warp switch, immediately returns to normal as before described. It will be recalled that after the warp switch is tripped, it must be restored manually through the medium of push button 62 before the burner can be started again and ignition attempted.

This arrangement prevents a series of automatic attempts at starting when, for any reason, as for instance, extinguishment of the pilot flame, ignition does not take place. Under such a condition, the repeated attempts at starting would result in supplying to the burner an additional amount of unburned fuel with consequent danger, loss and damage.

It will be noted that the relays used in the above circuit each has but one moving part or contact. Relays which employ a plurality of moving contacts often get out of adjustment and require attention by a skilled mechanic. This is particularly noticeable in the complicated relays used in telephone and telegraph systems. Where a plurality of moving contacts are provided each one, the movable contacts or springs may be so set as to hold another spring off its front or more particularly its back contact. The control system of a heating system, however, is usually placed in a private dwelling and, therefore, under the supervision of one often incapable of determining the trouble should a relay fail to operate properly or to remedy the defect, if located.

As the relays employed in the present system are provided with a single moving part or contact, there is nothing in the relay structure which can interfere with the definite firm engagement of the movable contact with either its front or back contact as the relay becomes energized or de-energized.

It may be readily understood that a control system employing relays, each having a single moving contact, is more certain in operation and will require less attention than systems employing relays having multiple moving contacts.

It is, of course, to be understood that another type of rectifier may be employed in place of the dry-plate rectifier 89; or the rectifier may, under certain circumstances, be entirely omitted. This, however, requires the use of alternating current relays with copper sleeves on their cores to prevent chattering of the armatures.

The manner in which spring finger 120 of the stack switch is arranged to slide over and become positioned behind the end of contact spring 112, together with the spring clutch which permits slippage between the operating spindle 96 and the switching head of said switch, insures the immediate opening of contacts 112, 116 whenever the combustion flame at the burner fails. This operates to stop motor 14 so it will not continue to furnish unburned fuel to the burner. This structure, however, permits the parts to return to normal operative position so that restarting automatically may be reattempted as soon as arm 117 forces spring 111 into engagement with its contact 115. The parts will preferably be so constructed and adjusted that from two to three minutes will be required to close contacts 111, 115 after combustion at the burner ceases. This provides sufficient time for the gases produced by supplying unburned fuel to a hot burner to be drawn up the stack.

While in the drawings and the above description a certain definite form of the apparatus is disclosed, it is to be understood that many modifications of the details of construction and operation are contemplated by the inventor. The invention, therefore, should be limited only by the scope of the appended claims.

Having thus described the invention, what is claimed as new and is desired to be secured by Letters Patent of the United States is:

1. In an automatic control for heating systems, a stack switch including two sets of contacts, a member for operating said contact sets, and actuating means for said operating member responsive to increase or decrease of temperature in said stack for moving said operating member, respectively, in one direction or the other, said member being effective to alter one set of contacts upon initial movement in one direction and to alter the other set of contacts only upon initial movement in the other direction.

2. In an automatic control for heating systems, a stack switch including two sets of contacts, a member for operating said contact sets, and actuating means for said operating member responsive to increase or decrease of temperature in said stack for moving said member, respectively, in one direction or the other, said member being effective to alter one set of contacts upon initial movement in one direction and to alter the other set of contacts only upon initial movement in the other direction, said operating member being arranged to re-establish the original condition of said one of said sets of contacts upon prolonged continued movement of said operating member in the said other direction.

3. In an automatic control for heating systems, a stack switch including two sets of contacts, a member for operating said contact sets, and actuating means for said operating member responsive to increase or decrease of temperature in said stack for moving said operating member, respectively, in one direction or the other, said member being effective to open one set of contacts upon initial movement in one direction and to open the other set of contacts only upon initial movement in the other direction, said operating member being arranged to close the said one of said sets of contacts upon prolonged continued movement of said operating member in the said other direction.

4. In an automatic control for heating systems, a stack switch including two sets of contacts, a member for operating said contact sets, and actuating means for said operating member responsive to increase or decrease of temperature in said stack for moving said operating member, respectively, in one direction or the other, said member being effective to open one set of contacts upon initial increase of temperature in the stack and to momentarily open the other set of contacts only upon initial movement in the other direction, said operating member being arranged to reestablish the original condition of said one of said sets of contacts upon prolonged continued movement of said operating member in the said other direction.

5. In an automatic control for heating systems, a stack switch, a contact spring arranged to engage a fixed contact, an operating member for said spring, actuating means therefor responsive to increase of temperature in said stack for moving said operating member in one direction and upon decrease of temperature for moving it reversely, means carried by said contact spring operating member arranged freely to pass by said contact spring when moved in one direction but move said contact spring to alter the effective relation of said stack switch contacts incident to initial movement of said contact operating member in the reverse direction.

6. In an automatic control for heating systems, a stack switch, contacts therefor, a contact spring normally maintaining said contacts in engagement, a contact spring operating member, actuating means therefor responsive to increase of temperature in said stack for moving said operating member in one direction and upon decrease of temperature for moving it in the other, means carried by said contact spring operating member arranged freely to pass by said contact spring when moved in one direction but move said contact spring to disengage said stack switch contacts incident to movement of said contact operating member in the reverse direction.

7. In an automatic control for heating systems, a stack switch, contacts therefor, a contact spring normally maintaining said contacts in engagement, a contact spring operating member, actuating means therefor responsive to increase of temperature in said stack for moving said operating member in one direction and upon decrease of temperature for moving it in the other, a spring finger carried by said contact spring operating member arranged freely to pass over said contact spring when moved in one direction but engage said contact spring to cause disengagement of said stack switch contacts incident to initial movement of said contact operating member in the reverse direction.

8. In an automatic control for heating systems, a stack switch, contacts therefor, a contact spring normally maintaining said contacts in engagement, a contact spring operating member, actuating means therefor responsive to increase of temperature in said stack for moving said operating member in one direction and upon decrease of temperature for moving it in the other, a spring finger carried by said contact spring operating member arranged freely to pass over said contact spring when moved in one direction, means for retaining said finger immediately adjacent to said contact spring irrespective of the continued functioning of said actuating means incident to further change of temperature in the stack, said finger operating to move said contact spring to disengage said stack switch contacts incident to initial movement of said contact operating member in the reverse direction.

9. In an automatic control for heating systems, a stack switch, a pair of contact springs, contacts arranged to be engaged by said springs, respectively, a contact operating member comprising a pair of arms, actuating means for said operating member responsive to increase of temperature in the stack for moving said operating member in one direction and upon decrease of temperature for moving said member in the opposite direction, one of the arms of said operating member being arranged when in one extreme position to effectively engage one of said contact springs, means carried by the other arm of said contact operating member arranged freely to pass over the other said contact spring when moved in one direction but effectively move said contact spring upon initial movement in the reverse direction.

10. In an automatic control for heating systems, a stack switch, a pair of contact springs, contacts arranged to be engaged by said springs, respectively, the flexure of said springs being such that one tends normally to engage its contact while the other said spring normally tends to separate from its contact, a contact spring operating member, actuating means for said operating member responsive to increase of temperature in the stack for moving said operating member in one direction and upon decrease of temperature for moving said member in the opposite direction, said operating member being arranged when in one extreme position to maintain closed the normally open said contact spring, and means carried by said contact operating member arranged freely to pass over the said normally closed contact spring when moved in one direction but move said normally closed contact spring from engagement with its contact upon initial movement in the reverse direction.

11. In an automatic control for heating systems, a stack switch, a pair of contact springs, contacts arranged to be engaged by said springs, respectively, the flexure of said springs being such that one tends normally to engage its contact while the other said spring normally tends to separate from its contact, a contact operating member comprising a pair of arms, actuating means for said operating member responsive to increase of temperature in the stack for moving said operating member in one direction and upon decrease of temperature for moving said member in the opposite direction, one of the arms of said operating member being arranged when in one extreme position to maintain closed the normally open contact spring, means carried by the other arm of said contact operating member arranged freely to pass over the said normally closed contact spring when moved in one direction but move said normally closed contact spring from engagement with its contact upon initial movement in the reverse direction.

12. In an automatic control for heating systems, a stack switch, a pair of contact springs, contacts arranged to be engaged by said springs, respectively, the flexure of said springs being such that one tends normally to engage its contact while the other said spring normally tends to separate from its contact, a contact operating member, actuating means for said operating member responsive to increase of temperature in the stack for moving said operating member in one direction and upon decrease of temperature for moving said member in the opposite direction, said operating member being arranged when in one extreme position to maintain closed the normally open contact, means carried by said contact operating member arranged freely to pass over the said normally closed spring when moved in one direction, and means for limiting the movement of said operating member to maintain said means immediately adjacent to said normally open spring, said means being arranged to move said normally closed contact spring from engagement with its contact upon initial movement in the reverse direction.

JOHN C. BOGLE.